May 14, 1963 D. G. JACOBSON Re. 25,385
LOW CROP HARVESTING ATTACHMENT FOR COMBINES
Original Filed March 2, 1960 3 Sheets-Sheet 1
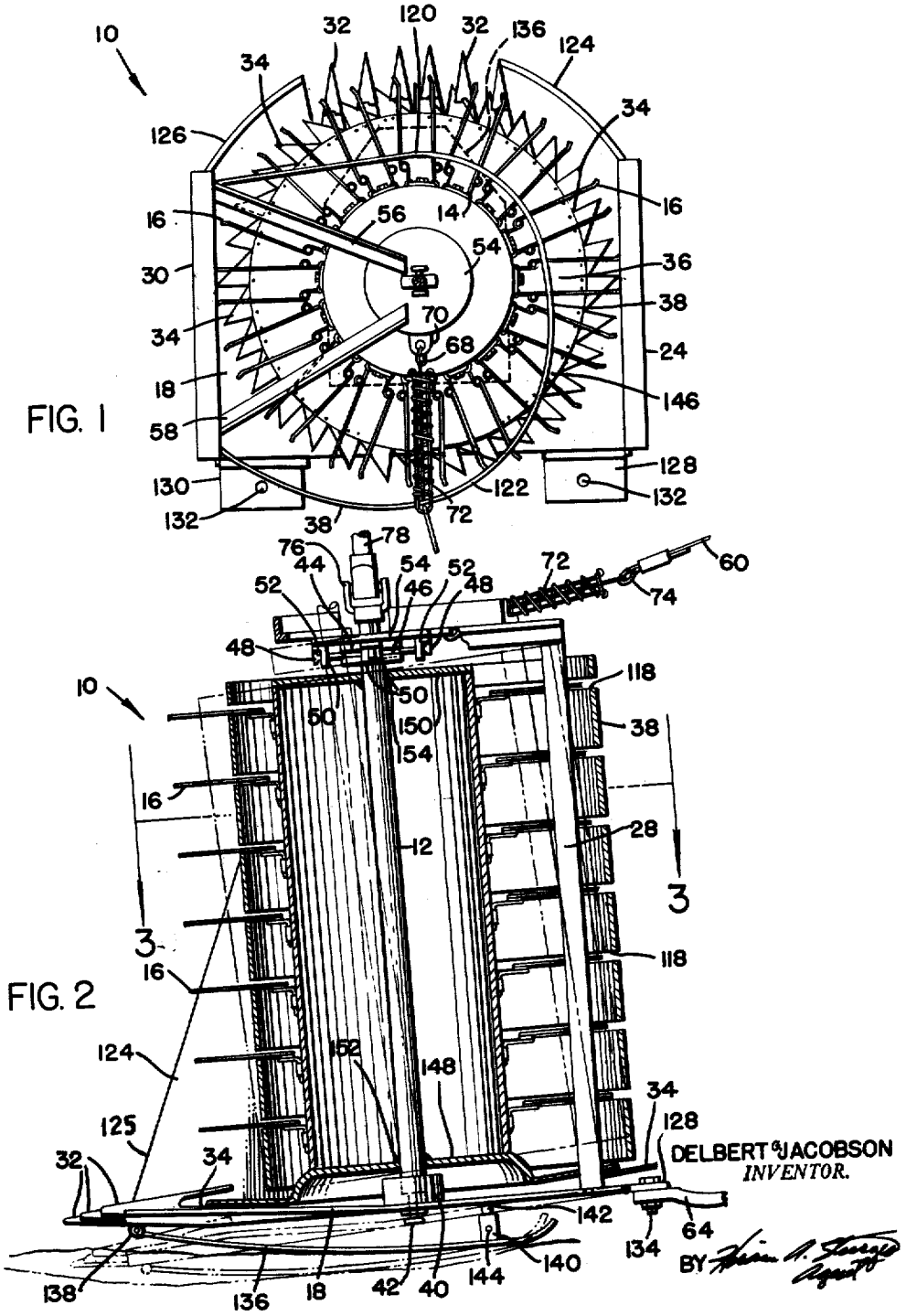

LOW CROP HARVESTING ATTACHMENT FOR COMBINES

Original Filed March 2, 1960 3 Sheets-Sheet 2

DELBERT G. JACOBSON
*INVENTOR.*

BY Hiram A. Sturges
Agent

LOW CROP HARVESTING ATTACHMENT FOR COMBINES

Original Filed March 2, 1960 3 Sheets-Sheet 3

DELBERT G. JACOBSON
INVENTOR.
BY Wm. A. Strauss
Agent

United States Patent Office

Re. 25,385
Reissued May 14, 1963

25,385

LOW CROP HARVESTING ATTACHMENT FOR COMBINES

Delbert G. Jacobson, Rte. 2, Castlewood, S. Dak.

Original No. 3,049,852, dated Aug. 21, 1962, Ser. No. 12,362, Mar. 2, 1960. Application for reissue Aug. 30, 1962, Ser. No. 220,584
9 Claims. (Cl. 56—23)

Matter enclosed in heavy brackets [ ] appears in the original patent but forms no part of this reissue specification; matter printed in italics indicates the additions made by reissue.

This invention relates to combines and [particularly] attachments for combines, [and the like,] and in particular a pair of [substantially cylindrical] vertically disposed units having cutter blades [and guards] *at their lower ends* for [harvesting] *cutting* low [products on the lower ends] *crops* and *having* horizontally disposed spring fingers [in the intermediate parts] *thereabove* for raking in the vines and [depositing] *moving* the vines or plants *rearwardly* into a combine scoop.

The purpose of this invention is to provide means for harvesting low crops, such as soy bean plants or vines.

An object of this invention is, therefore, to provide a soy bean harvesting unit for attachment to a combine whereby the necessity for special implements or cutterheads is obviated.

An important object of this invention is to provide a soy bean harvester the construction and operation of which facilitates harvesting as well as reducing the waste of lost grain.

The lower pods of the soy bean plant grow close to the ground and in many plants the lower pods are actually on the ground. The position of the pods varies since some of the rows are low, even as much as several inches lower than other rows. Conventional harvesting equipment cannot harvest the lower pods which results in a great loss of potential crop. Sometimes the variance in ground level between rows, when a harvester of the type having a single giant unit cutter head is used, results in as much as 10 to 20 percent loss of potential crop harvest.

The wheels of a combine are intended to ride in the furrows between rows, however, the wheels often ride up on the rows climbing to the top and this destroys the adjustment of a fixed cutter bar assembly. When this happens an even greater percentage of soy bean crop remains unharvested.

It is, therefore, an object of my invention to provide a soy bean harvester with separate cutting units independently mounted with respect to each other and adjustable to the height of that particular row above which it is operating.

Still another object is to provide a harvester for crops which must be cut very close to the ground to gain maximum harvest; and to provide a harvester the construction and operation of which eliminates the major problem of the cutting unit digging into the ground, which causes the cutter to become dull because of the abrasive action of the soil against the cutting sickle.

A particular object of this invention is to provide a soy bean harvesting unit which may be mounted on a combine in pairs depending upon the size of the combine and which is of simple construction so that it will perform the operation of harvesting two or more rows of soy beans, or similar plant, simultaneously and which may be operated from the conventional combine mechanism.

With these and other objects and advantages in view, the invention embodies a vertically disposed spindle, a drum positioned around the spindle, a frame in which the spindle and drum are mounted, rings of spring fingers carried by and extended from the drum, cutters positioned at the forward side and at the lower end of the drum, a skid or shoe positioned at the lower end of the drum, and driving means for the drum and spindle.

Other features and advantages of the invention will appear from the following description taken in connection with the drawings, wherein:

FIGURE 1 is a plan view of one of the harvesting units of a combine with the combine omitted.

FIGURE 2 is a vertical longitudinal section through the center of the unit shown in FIGURE 1, showing the parts in an upright position in full lines and in a forwardly tilted position in broken lines.

Figure 3:
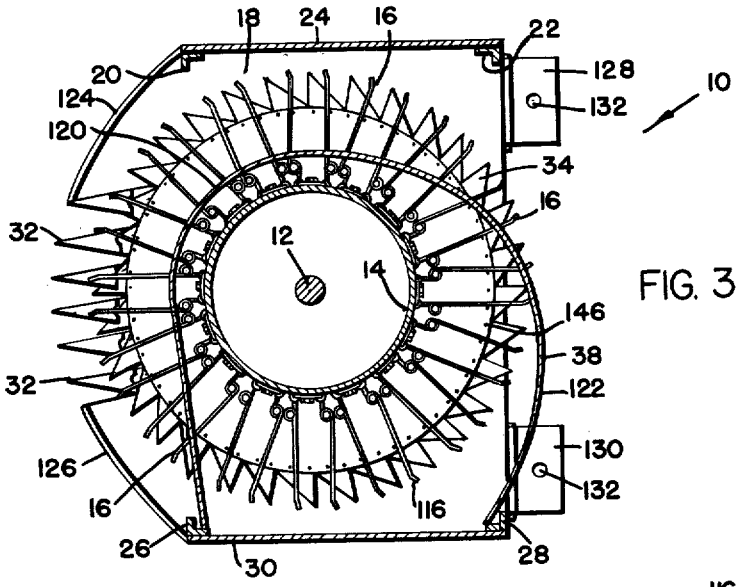
FIGURE 3 is a sectional plan through a unit of the low vine harvester taken on line 3—3 of FIGURE 2.
Figure 4:
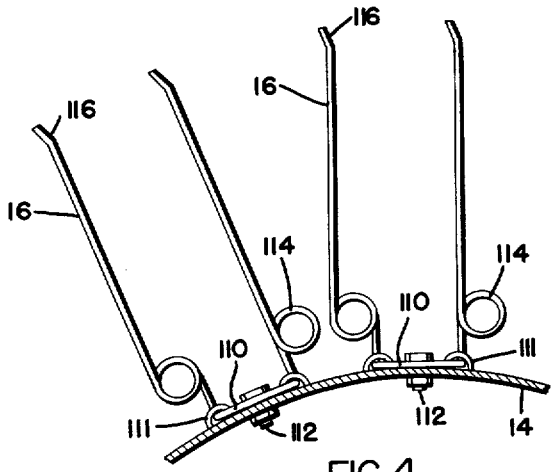
FIGURE 4 is a view showing the spring fingers and mounting means thereof, with the parts shown on an enlarged scale.
Figure 5:
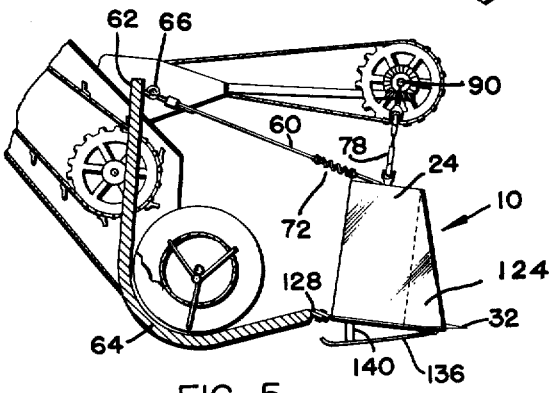
FIGURE 5 is a longitudinal section on a comparatively small scale showing the low crop attachment mounted on the edge of the scoop of a combine.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the *harvester attachment of this* invention in its entirety, numeral 12 indicating a spindle of a low crop harvester unit, numeral 14 a drum mounted on the spindle and having spring wire fingers 16 mounted on and extended from the peripheral surface, numeral 18 a bowl-shaped base or sickle plate upon which the spindle and drum are mounted, *numeral 19 a frame,* numerals 20 and 22 posts of the supporting frame *19, the posts 20 and 22 being* connected by a *frame* side plate 24 at one side of the unit, numerals 26 and 28 posts of the frame connected by a *frame* side plate 30 at the opposite side of the unit, numeral 32 cutter bar guards mounted on and extended from the leading edge of the base plate, numeral 34 cutterblades mounted on and extended from a flange 36 extended from the lower end of the drum 14 and positioned to coact with the guards for cutting vines, plants, and the like, numeral 38 an arcuate shield having vertically spaced horizontally disposed slots 118 therein positioned with the spring fingers extended radially through the slots and formed to remove vines, plants and the like from the spring fingers and deposit the said vines, plants, and the like in the scoop of a combine on which the unit is mounted, and an adjustable shoe or skid pivotally mounted on the under surface of the base plate.

The lower end of the spindle 12 is rotatably mounted in a cup bearing 40 in the lower end of which an adjusting screw 42 is threaded and by turning the adjusting screw the cutting knives or blades are adjusted vertically in relation to the guards.

The upper end of the spindle 12 is rotatably mounted in a bearing 44 having an annular groove 46 in the peripheral surface and the position of the upper end of the spindle is adjusted by set screws 48 which are threaded in depending legs 50 of clip angles 52 secured to the under surface of a disc 54. The disc 54 is supported by angle bars 56 and 58 which extend from the angle bar posts 26 and 28, and the inner ends of the set screws extend into the annular groove 46 of the bearing 44.

The upper end of the unit is supported by a cable 60 one end of which is anchored to the rear wall 62 of a combine scoop 64 by a ring 66, and the opposite end of which is connected by an eye bolt 68 to a tang 70 extended from the disc 54 through a spring assembly 72 to which the cable is attached by an eye 74.

The upper end of the spindle 12 is connected by a universal joint 76 to a telescoping shaft 78, and the upper end of the shaft 78 is connected by a universal joint 80 to a shaft 82 on the upper end of which a bevel gear 84 is secured by a pin 86. The bevel gear 84 meshes with a similar gear 88 which is secured on a shaft 90 by a pin 92, and the gear 88 is provided with an extended hub 94 which is rotatably mounted in a bearing 96 that is secured by an angle bracket 98 to a bearing 100 in which the shaft 82 is rotatably mounted. The shaft 90 is rotatably mounted by bearings 102 and 104 in the end walls of the combine scoop 64, and the parts are retained in position on the shaft by a set collar 106 having a set screw 108 therein.

The spring fingers are preferably formed in pairs in which the inner ends are connected by loops 110, and the loops are secured to the outer surface of the drum 14 by clips 111 and bolts 112. Each spring finger is provided with a loop 114, and the outer ends 116 are inclined rearwardly to facilitate vines and plants being pushed therefrom.

The spring fingers 16 are positioned to extend through horizontally disposed vertically spaced slots 118 in the shield 38, and, as shown in FIGURES 1 and 3, the shield extends from the post 26 inwardly to a point 120, outwardly to a point 122, and then inwardly to the post 28. With the shield positioned in this manner vines are carried by the spring fingers in a clockwise direction, with the parts as shown in FIGURES 1 and 3, and as they approach the point 122 the vines drop from the fingers into the scoop 64 of the combine.

The leading edges of the side walls 24 and 30 are provided with arcuate baffles 124 and 126 and the edges 125 of the baffles are inclined, as shown in FIGURE 2.

The trailing edge of the base plate 18 is provided with hinges 128 and 130, in which bolt holes 132 are positioned, and the hinges are secured to the edge of the scoop 64 by bolts 134.

The unit is also supported by a spring skid or shoe 136 the leading end of which is attached by a hinge 138 to the base plate, and the rear end of the shoe is provided with small spaced cylinders 140 into which pins 142 on the under surface of the base plate telescope, and the pins 142 are secured in the cylinders 140 by cotter pins 144, or the like.

The cutter blades 34, which are similar to the cutting knives of a sickle bar of a mowing machine, are secured to the flange 36 by rivets, or other fasteners 146, and the blades may readily be removed and replaced. The flange 36 on which the cutter blades are mounted extends from an arcuate, upwardly disposed section 148, which forms the lower end of the drum 14, and the upper end of the drum is closed by a circular plate 150. The section 148 and the plate 150 are secured to the spindle 12 by welding or the like, as shown at the points 152 and 154.

It will be seen that the skid 136, the base plate 18 and members attaching these parts together form, in combination, a ground-engaging support means upholding the rest of each harvester attachment.

The telescoping shaft 78 and universal joint 76, the universal joint 80 and the shaft 82 together form a flexible means attached to the upper end of the spindle for connecting the spindle 12 drivably to driving means therefor, most of which latter is not shown.

The spring 72 and cable 60 together form a retainer means to retain the harvester attachment 10 from excessive downward movement at its forward end.

OPERATION

For purposes of illustration, a two-row combine is shown in the drawing, it being understood that two units are employed on a two-row combine and four units on a four-row combine.

Figure 7:
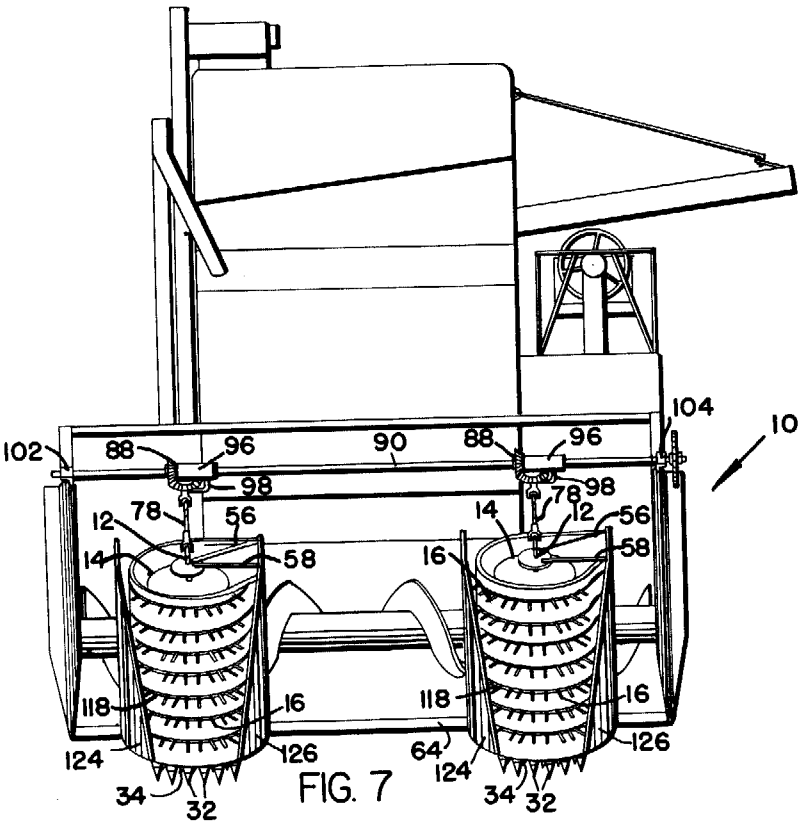
FIGURE 7 is a front elevational view of a combine with a pair of low crop harvester units carried by the forward edge of the scoop of the combine.
Figure 6:
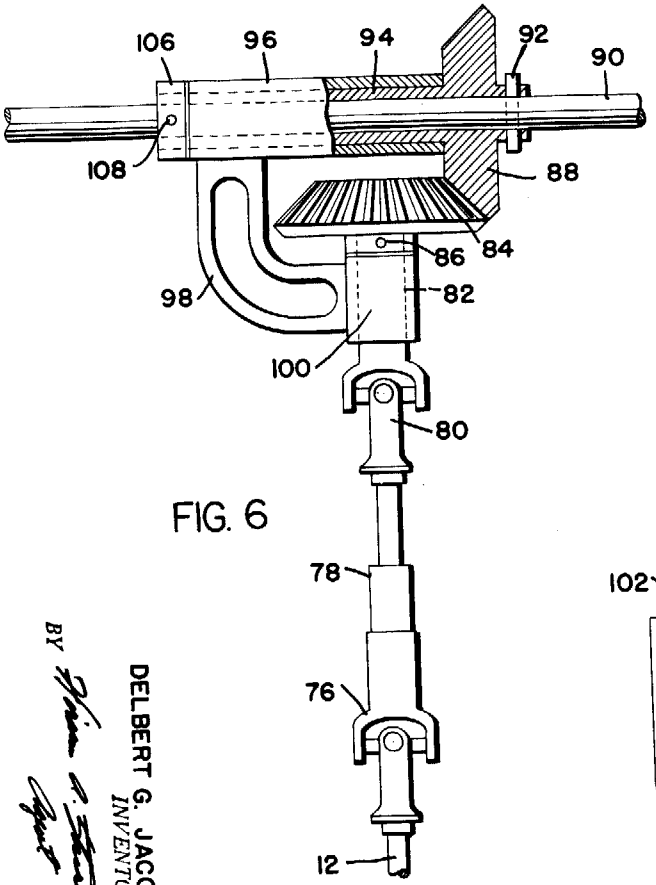
FIGURE 6 is a view illustrating the driving gear assembly of one of the low crop harvester units with the parts shown on an enlarged scale, and with parts shown in section.

As illustrated in FIGURE 7, a pair of units are mounted on the leading edge of a scoop of the combine and with the units spaced to correspond with the distance between rows of vines or plants, the combine is driven along the rows with vines cut by the cutter knives gripped by the spring fingers and deposited into the scoops.

With the parts mounted as illustrated and described the units may be tilted forwardly, as indicated by the broken lines, following the ground contour to cut vines or plants unusually close to the ground.

The bowl-shaped base or sickle plate makes it possible for the stalks to go from ground level up to the lip of the combine without the use of a ramp or the like.

With the bowl-shaped base or sickle plate tilted forward as shown in FIGURE 2, the guards are positioned substantially parallel to the ground.

The bowl-shaped sickle plate must be formed so that with normal unit tilt the sickle sections, when at ground level, are parallel with the guards and ground. Then since the sickle plate lies on an inclined plane, the guards, as individual units, increase in elevation in respect to ground level, as they move from the forward edge of the unit toward the lip of the combine scoop.

*It will be seen that the side wall 24 together with the attached arcuate baffle 124 form an outer guide shield spaced horizontally outwardly from the inner arcuate shield 38.*

*The outer guide shield formed by the side wall 24 forms with the inner arcuate shield 38 a stalk guiding channel extending continuously from the forward side of the harvester attachment 10, around that side thereof on which the fingers 16 are moving rearwardly, and extending to the rear of the attachment. The rearward end of the outer guide shield, which latter is the rearward end of the side wall 24, is spaced to the respective right hand side of the attachment from the inner arcuate shield 38 so as to form an exit from the stalk guiding channel for deliverance of stalks rearwardly through said exit to a combine disposed rearwardly of the attachment.*

From the foregoing specification, it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size and arrangement of details and parts such as come within the purview of the invention claimed may be resorted to in actual practice if desired.

I claim:

1. In a low crop harvester, the combination which comprises a vertically disposed spindle, a drum carried by the spindle, a base plate upon which the spindle and drum are positioned, a frame mounted on the base plate and in which the upper end of the spindle is rotatably mounted, a shield having vertically spaced horizontally disposed slots therein mounted on the frame and extended around the drum, the shield being positioned whereby the spring fingers travel through the slots therein, and wherein the shield pushes products from the spring fingers upon rotation of the drum with the spring fingers thereon, a horizontally disposed cutter assembly at the lower end of the drum, means for mounting the harvester on a combine, means for tilting the drum and cutter assembly forwardly to compensate for uneven surfaces of the ground, and a universal joint on the upper end of the spindle for connecting the spindle to power means for actuating the harvester assembly from the power take off of the combine.

2. In a low crop harvester unit, the combination which comprises a horizontally disposed base plate, skids upon which the base plate is positioned, a frame mounted on the base plate and extended upwardly therefrom, a spindle positioned with the lower end rotatably mounted on the base plate and the upper end rotatably mounted in the frame, a drum mounted on the spindle, vertically spaced horizontally disposed spring fingers mounted on the drum and extended therefrom, a cutter bar extended from the lower end of the drum, a shield having vertically spaced horizontally disposed slots therein mounted on the frame and extended around the drum, said shield being positioned whereby the spring fingers travel in the slots of the shield and patterned so that the distance between the shield and drum increases from the leading side of the harvester, or a point above the cutter bars to the opposite or trailing side where products are forced from the spring fingers, a universal joint on the upper end of the spindle for connecting the spindle to power means for mounting the unit on the scoop of a combine, means for tilting the unit in relation to the combine to compensate for uneven surfaces of the ground, and a universal joint on the upper end of the spindle for connecting the spindle to power means for rotating the drum and actuating the cutter bar by the combine.

3. A low crop harvester comprising a bowl-shaped base plate providing a sickle plate, a spindle mounted on and extended upwardly from the sickle plate, a supporting frame also mounted on and extended upwardly from the sickle plate, means mounting the upper end of the spindle in said supporting frame, a drum mounted on and extended around the spindle, spring fingers fixedly mounted on the drum and extended radially therefrom, a stationary arcuate shield carried by the frame and extended around the drum, said shield having vertically spaced horizontally disposed slots therein and the slots being positioned to receive the spring fingers extended from the drum, spaced cutter bar guards mounted on and extended from the sickle plate, cutter blades carried by the lower end of the drum and positioned to coact with the guards of the sickle plate for cutting products at the leading side of the harvester, the distance of the shield from the surface of the drum increasing from the leading to the trailing side of the harvester unit so that products are pushed from the spring fingers upon rotation of the drum, a combine scoop extended from the sickle plate and positioned to receive products forced from the spring fingers, and a universal joint on the upper end of the spindle for connecting the spindle to driving means therefor.

4. A low crop harvester as described in claim 3, wherein the sickle plate is connected to the scoop by hinges permitting tilting of the assembly whereby the cutting portion of the sickle plate is substantially parallel to the ground.

*5. A low crop harvester attachment for combines comprising a ground-engaging support means, a sickle plate adjacent to said support means and having on its forward side a set of stationary cutting teeth, means attaching said sickle plate to said ground-engaging means, laterally spaced tooth guards mounted on the forward portion of said support means and extending forwardly therefrom, the undersides of said guards being substantially horizontal so that the guards do not tend to dig into the ground and so that the forward ends of said guards are low enough to get under a substantial quantity of those bean stalks which are lying across and close to the ground, a spindle rotatably mounted on and extending upwardly from said support means, a frame also mounted on and extending upwardly from said support means, spring fingers extending radially outward with respect to said spindle, finger-carrying means mounting said fingers on said spindle for rotation therewith, means rotatably mounting the upper end of said spindle in said supporting frame, a stationary arcuate shield carried by said frame and extending around said finger-carrying means, said shield having vertically spaced horizontally disposed slots therein and the slots being positioned to receive the spring fingers extended from the finger-carrying means, circular cutter blade means, means rotatably mounting said cutter blade means on said spindle for rotation therewith, said circular cutter blade means having a position and shape and said sickle plate having a shape such that the forward portion of said cutter blade means is disposed above and in adjacent cutting relationship to said stationary teeth of said sickle plate, the distance of the shield from the surface of said spindle increasing from the leading to the trailing side of the harvester unit so that products are pushed from the spring fingers upon rotation of said spindle, means for attaching said support means to a combine scoop, and flexible means attached to the upper end of said spindle for connecting said spindle drivably to driving means therefor, a guide shield means spaced horizontally outwardly from said arcuate shield and forming with the said arcuate shield a stalk guiding channel extending continuously from the forward side of the harvester attachment around that side thereof on which the said fingers are moving rearwardly and extending to the rear of the attachment on the respective side of said arcuate shield whereby said stalk guiding channel has an exit for deliverance of stalks through said exit to a combine disposed rearwardly of said attachment.*

*6. The combination of claim 5 in further combination with a combine scoop and in which said means for attaching said support means to said combine scoop defines a pivotal attachment permitting the forward end of said harvester attachment to move upwardly and downwardly about said attaching means.*

*7. The combination of claim 5 in further combination with a combine scoop and in which said means for attaching said support means to said combine scoop defines a pivotal attachment permitting the forward end of said harvester attachment to move upwardly and downwardly about said attaching means, and retainer*

*means attachable to a combine, said retainer means comprising springs and being attached to said frame to retain said attachment from excessive downward movement at its forward end.*

*8. The combination of claim 5 in which said flexible means comprises a telescoping shaft having a universal joint at each of its ends.*

*9. The harvester attachment of claim 5 in combination with cutting tooth guards attached to and extending forwardly from said sickle plate, the undersides of said guards being substantially horizontal so that the guards do not tend to dig into the ground and so that the forward ends of said guards are low enough to get under a substantial quantity of those bean stalks which are lying across and close to the ground.*

References Cited in the file of this patent or the original patent

UNITED STATES PATENTS

| | | |
|---|---|---|
| 754 | Wheeler | May 30, 1838 |
| 1,370 | Trask et al. | Oct. 16, 1839 |
| 17,223 | Kellogg | May 5, 1857 |
| 2,700,265 | Spieth et al. | Jan. 25, 1955 |
| 2,836,026 | Gray et al. | May 27, 1958 |